United States Patent
Takano et al.

(10) Patent No.: US 7,013,966 B2
(45) Date of Patent: Mar. 21, 2006

(54) VEHICLE AIR CONDITIONER WITH HOT-GAS HEATER CYCLE

(75) Inventors: Yoshiaki Takano, Kosai (JP); Satoshi Izawa, Anjo (JP); Toshitaka Shimizu, Nishio (JP)

(73) Assignee: DENSO Corporation, Kariya (JP)

( * ) Notice: Subject to any disclaimer, the term of this patent is extended or adjusted under 35 U.S.C. 154(b) by 286 days.

(21) Appl. No.: 10/309,632

(22) Filed: Dec. 4, 2002

(65) Prior Publication Data

US 2003/0102119 A1   Jun. 5, 2003

(30) Foreign Application Priority Data

Dec. 5, 2001   (JP)   ............... 2001-371782

(51) Int. Cl.
- B60H 1/02   (2006.01)
- F25B 1/00   (2006.01)
- F25B 29/00   (2006.01)

(52) U.S. Cl. ............... 165/202; 165/42; 165/43; 165/265; 62/1.61; 62/164; 62/196.4

(58) Field of Classification Search ............... 62/196.4, 62/162, 163, 164, 161; 165/202, 42, 43, 165/265

See application file for complete search history.

(56) References Cited

U.S. PATENT DOCUMENTS 5,291,941 A   3/1994   Enomoto et al.

6,105,375 A   8/2000   Takano et al.

FOREIGN PATENT DOCUMENTS

| EP | 0 894 651 | 2/1999 |
|---|---|---|
| EP | 0 913 281 | 5/1999 |
| JP | 3-121905 | 12/1991 |

OTHER PUBLICATIONS

Japanese Examination Report dated May 11, 2004 from corresponding Japanese Application No. 2001-371782.
European Office Action dated Dec. 2, 2003 from corresponding European Application No. 02 02 6903.

*Primary Examiner*—John K. Ford
(74) *Attorney, Agent, or Firm*—Harness, Dickey & Pierce, PLC

(57) ABSTRACT

A vehicle air conditioner selectively switches one of a cooling mode in which an interior heat exchanger of a refrigerant cycle is operated as an evaporator for cooling air, and a hot-gas heating mode in which the interior heat exchanger is operated as a radiator for heating air. The cooling mode is selected by turning on an air-conditioning switch, and the hot-gas heating mode is selected by turning on a hot gas switch. When both the switches are turned on at the same time, a control unit determines a priority mode having a higher necessity among the hot-gas heating mode and the cooling mode. Specifically, the hot-gas heating mode is automatically set by the control unit when the outside air temperature is lower than a predetermined temperature, and the cooling mode is automatically set by the control unit when the outside air temperature is higher than the predetermined temperature.

9 Claims, 6 Drawing Sheets

VEHICLE AIR CONDITIONER WITH HOT-GAS HEATER CYCLE

CROSS-REFERENCE TO RELATED APPLICATION

This application is related to and claims priority from Japanese Patent Application No. 2001-371782 filed on Dec. 5, 2001, the content of which is hereby incorporated by reference.

BACKGROUND OF THE INVENTION

1. Field of the Invention

The present invention relates to a vehicle air conditioner with a hot-gas heater cycle in which an interior heat exchanger is operated as a radiator by introducing hot gas refrigerant from a compressor directly into the interior heat exchanger.

2. Description of Related Art

A conventional vehicle air conditioner, disclosed in JP-A-5-223357 (corresponding to U.S. Pat. No. 5,291,941), performs a hot-gas heating mode using a hot-gas heater cycle in a refrigerant cycle system (hot-gas heating operation). In this conventional vehicle air conditioner, when a temperature of cooling water (hot water) from a vehicle engine to a heater core is lower than a predetermined temperature, for example, when operation of the vehicle engine is started, gas refrigerant discharged from a compressor is introduced directly into an interior heat exchanger while bypassing a condenser. In this case, heat is radiated from gas refrigerant to air in the interior heat exchanger, so that auxiliary heating function can be obtained from the interior heat exchanger relative to hot-water heating function (main heating function) in the heater core. That is, in this conventional vehicle air conditioner, a single interior heat exchanger disposed in an air conditioning case is selectively operated as an evaporator in a cooling mode and as a radiator in the heating mode. For example, the hot-gas heating mode is normally performed in a low outside-temperature area where an outside air temperature is lower than 10 degrees centigrade (° C.). On the other hand, a cooling mode in the refrigerant cycle system is performed not only for cooling a passenger compartment in a cooling operation of the passenger compartment in the summer but also for defrosting a windshield in a heating operation of the passenger compartment in the winter. This cooling mode in the refrigerant cycle system is performed until the outside air temperature is reduced to 0° C., and is stopped in a very low outside-temperature area where the outside air temperature is lower than 0° C.

However, the using areas of the hot-gas heating mode and the cooling mode in the refrigerant cycle system may be overlapped in an outside-temperature area between 0° C. and 10° C. The conventional vehicle air conditioner includes a hot-gas switch and an air conditioning switch which are manually operated by a passenger. When the hot-gas switch is turned on, the hot-gas heating mode is performed in the refrigerant cycle system. On the other hand, when the air conditioning switch is turned on, the cooling mode is performed in the refrigerant cycle system. Here, when any one of the hot-gas switch and the air conditioning switch is once turned on, its turned-on state is maintained until it is again operated. For example, when the air conditioning switch was turned on in the previous operation of a vehicle engine, its turned-on state is maintained. In this case, when the hot-gas switch is turned on in the present operation of the vehicle engine, both the switches are turned on. Accordingly, for example, the cooling mode can be considered to be prior to the hot-gas heating mode, and can be always automatically selected in the refrigerant cycle system. However, in this case, the hot-gas heating mode cannot be performed even in the very low outside-temperature area where the hot-gas heating mode is required.

SUMMARY OF THE INVENTION

In view of the above problem, it is an object of the present invention to provide a vehicle air conditioner with a refrigerant cycle where one of a hot-gas heating mode and a cooling mode can be selectively performed in accordance with a necessity, when both of a hot-gas switch and an air conditioning switch are turned on at the same time.

According to the present invention, a vehicle air conditioner includes a cooling mode switch for outputting an operational command of a cooling mode in a refrigerant cycle, a heating mode switch for outputting an operational command of a heating mode in the refrigerant cycle. The heating mode switch is operated in independent from the cooling mode switch, and operation of the refrigerant cycle is controlled by a control unit. The control unit selects the cooling mode when the operational command from the cooling mode switch is input to the control unit. On the other hand, the control unit selects the heating mode when the operational command from the heating mode switch is input to the control unit. When the operational commands from both of the cooling mode switch and the heating mode switch are input to the control unit at the same time, the control unit determines a priority mode having a higher necessity among the cooling mode and the heating mode, and selects the priority mode. Accordingly, when the heating mode is required, the heating mode (hot-gas heating mode) is automatically selected in the refrigerant cycle by the control unit, so that heating performance for heating a passenger compartment can be improved. Therefore, heating operation of the passenger compartment can be rapidly started. On the other hand, when the cooling mode is required, the cooling mode is automatically selected in the refrigerant cycle by the control unit, so that cooling or/and defrosting performance in the passenger compartment can be improved. For example, even in the heating operation of the passenger compartment, when the defrosting performance of a windshield is required to be improved, the cooling mode is automatically set in the refrigerant cycle by the control unit.

Specifically, the control unit determines the priority mode based on an air temperature outside the passenger compartment. In this case, the control unit selects the cooling mode when the air temperature outside the passenger compartment is higher than a predetermined air temperature, and the control unit determines the heating mode when the air temperature outside the passenger compartment is equal to or lower than the predetermined air temperature. Alternatively, the control unit determines the priority mode based on an air temperature inside the passenger compartment. In this case, the control unit selects the cooling mode when the air temperature inside the passenger compartment is higher than a predetermined air temperature, and the control unit selects the heating mode when the air temperature inside the passenger compartment is equal to or lower than the predetermined air temperature. Alternatively, the control unit determines the priority mode based on an air inlet mode for introducing air to be blown toward the interior heat exchanger in the air conditioning case. In this case, the control unit selects the cooling mode when the air inlet mode is an inside-air inlet mode in which air inside the passenger compartment is introduced in the air conditioning case to be blown toward the interior heat exchanger, and the control unit selects the heating mode when the air inlet mode is an outside-air inlet mode in which air outside the passenger compartment is introduced in the air conditioning case to be blown toward the interior heat exchanger. Alternatively, the control unit determines the priority mode based on an air outlet mode for blowing air after passing through the interior heat exchanger into the passenger compartment. In this case, the control unit selects the cooling mode when the air outlet mode is a defrosting-performance enhancing mode in which defrosting performance for defrosting a windshield is enhanced, and the control unit selects the heating mode in an air outlet mode except for the defrosting-performance enhancing mode. Accordingly, one of the heating mode and the cooling mode can be suitably selected in accordance with the necessity, when both the hot-gas switch and the air-conditioning switch are turned on at the same time.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
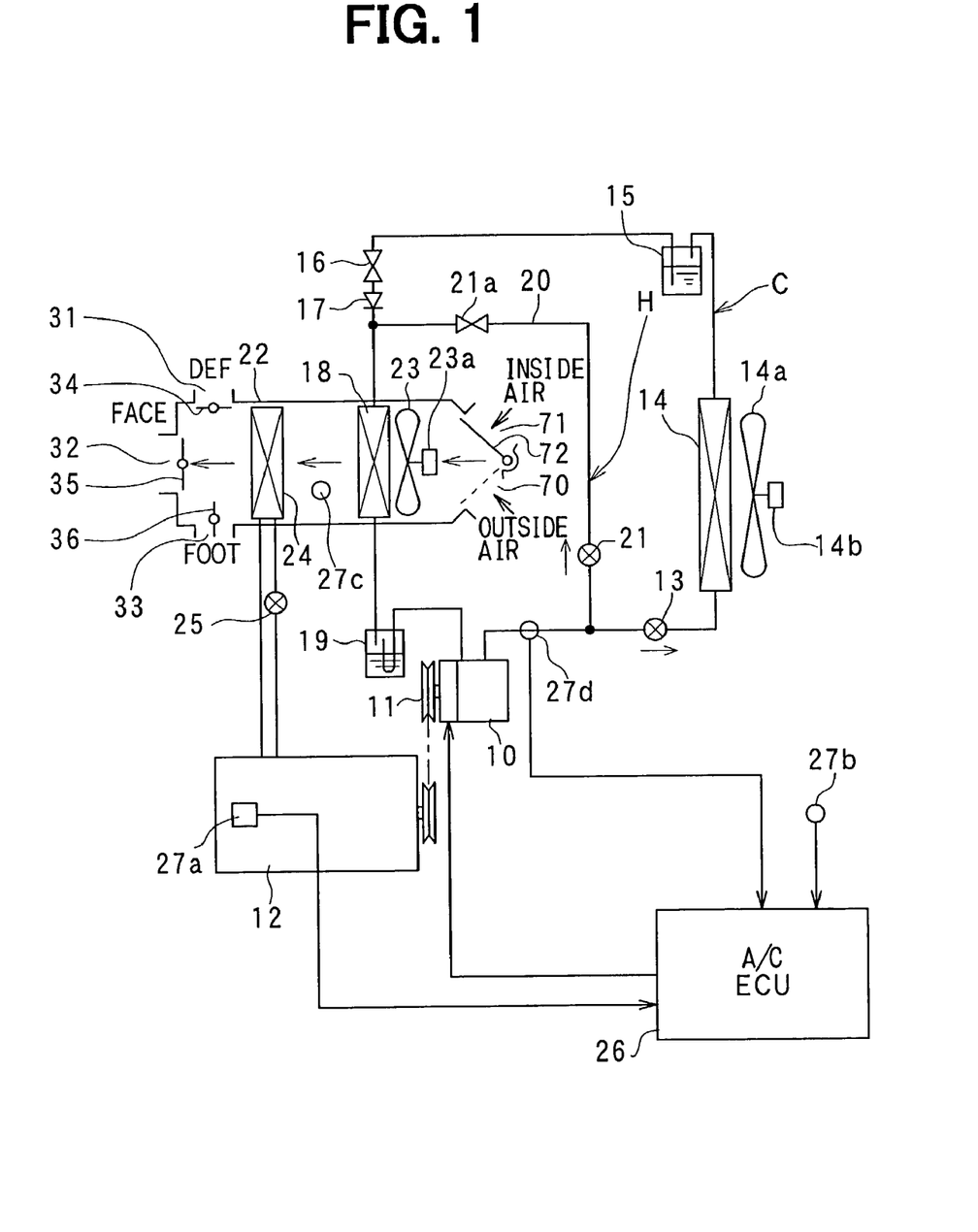
FIG. 1 is a schematic diagram showing an entire system of a vehicle air conditioner having a refrigerant cycle according to a first embodiment of the present invention.

A vehicle air conditioner according to the first embodiment is shown in FIG. 1. A compressor 10 is driven by a water-cooled vehicle engine 12 through a solenoid clutch 11, and is constructed by a fixed-capacity swash-plate compressor, for example. A discharge port of the compressor 10 is connected to a condenser 14 through a cooling solenoid valve 13, and an outlet of the condenser 14 is connected to a receiver 15 for separating refrigerant into gas refrigerant and liquid refrigerant and for storing therein the separated liquid refrigerant. The condenser 14 is disposed in an engine compartment together with the compressor 10 and the like, and is an exterior heat exchanger where refrigerant is heat-exchanged with outside air blown by an electric cooling fan 14a. An outlet of the receiver 15 is connected to a thermal expansion valve 16 constructing a cooling decompression device, and an outlet of the thermal expansion valve 16 is connected to an inlet of an evaporator 18 through a check valve 17. An outlet of the evaporator 18 is connected to a suction port of the compressor 10 through an accumulator 19. As described above, a cooling refrigerant cycle C is constructed by a closed circuit from the discharge port of the compressor 10 to the suction port of the compressor 10, through the cooling solenoid valve 13, the condenser 14, the receiver 15, the thermal expansion valve 16, the check valve 17, the evaporator 18 and the accumulator 19.

The thermal expansion valve 16 adjusts a flow amount of refrigerant by adjusting a valve open degree, so that a super-heating degree of refrigerant at the outlet of the evaporator 18 is maintained at a predetermined value in a cooling mode. Refrigerant flows from the outlet of the evaporator 18 into the accumulator 19. The accumulator 19 includes a tank body in which the refrigerant is separated into gas refrigerant and liquid refrigerant and the separated liquid refrigerant is stored therein. The separated gas refrigerant in the tank body at the upper side is introduced to the suction port of the compressor 10. The liquid refrigerant containing of lubrication oil is stored in the tank body of the accumulator 19 at the lower side. A small amount of the liquid refrigerant is sucked into and mixed with the gas refrigerant, and the mixed refrigerant is introduced to the compressor 10. Further, a hot-gas bypass passage 20, through which hot gas refrigerant from the compressor 10 bypasses the condenser 14 and the like, is provided between the discharge port of the compressor 10 and the inlet of the evaporator 18. A heating solenoid valve 21 and a throttle 21a are provided in series in the hot-gas bypass passage 20. The throttle 21a constructs a heating decompression device, and can be constructed by a fixed throttle such as an orifice and a capillary. A hot gas heating cycle H is constructed by a closed circuit from the discharge port of the compressor 10 to the suction port of the compressor 10 through the heating solenoid valve 21, the throttle 21a, the evaporator 18 and the accumulator 19.

An air conditioning case 22 of the vehicle air conditioner defines an air passage through which air blown by an electric air-conditioning blower 23 flows into a passenger compartment. The air conditioning blower 23 is shown as an axial flow fan in FIG. 1 for simplifying the drawing. However, actually, the air conditioning blower 23 is a centrifugal blower including a centrifugal fan. The air conditioning blower 23 is driven and rotated by an electric blower motor 23a controlled by a blower driving circuit. An air blowing amount from the blower 23 can be changed continuously or in stepwise by adjusting a blower control voltage applied to the blower motor 23a. An outside air inlet port 70, an inside air inlet port 71 and a plate-shaped inside-outside air switching door 72 are provided at an air suction side of the air conditioning blower 23. The outside air inlet port 70 is for sucking outside air outside the passenger compartment, and the inside air inlet port 71 is for sucking inside air inside the passenger compartment. The switching door 72 is driven by an actuator such as a servomotor through a link mechanism (not shown), to switch one of an outside air inlet mode and an inside air inlet mode, for example. Outside air is sucked from the outside air inlet port 70 in the outside air inlet mode, and inside air is sucked from the inside air inlet port 71 in the inside air inlet mode, for example.

The evaporator 18 is an interior heat exchanger provided in the air conditioning case 22. In the cooling mode, refrigerant is circulated in the cooling refrigerant cycle C, and is evaporated in the evaporator 18 by absorbing heat from air, so that air passing through the evaporator 18 is cooled. In the heating mode, high-temperature gas refrigerant (hot gas) from the compressor 10 flows into the evaporator 18 through the hot-gas bypass passage 20, so that air passing through the evaporator 18 is heated by the high-temperature gas refrigerant. That is, the evaporator 18 is operated as a cooler in the cooling mode and as a radiator in the heating mode. A hot-water heating heat exchanger 24 is disposed in the air conditioning case 22 at a downstream air side of the evaporator 18, for heating blown air using hot water (engine cooling water) from the vehicle engine 12 as a heat source. A hot water valve 25 is provided in a hot water circuit, for adjusting a flow amount of hot water flowing into the heating heat exchanger 24. Here, the heating heat exchanger 24 is used as a main heating unit for heating the passenger compartment, and the evaporator 18 is used as an auxiliary heating unit when being operated as a radiator in the hot-gas heater cycle H.

A defroster (DEF) air port 31, a face air port 32 and a foot air port 33 are provided at the most downstream air side in the air conditioning case 22. Conditioned air (mainly warm air) is blown to an inner surface of a windshield from the DEF air port 31. Conditioned air (mainly cool air) is blown toward the upper half body of a passenger from the face air port 32, and conditioned air (mainly warm air) is blown toward the foot portion (lower half body) of the passenger from the foot air port 33. Mode switching doors 34–36 are rotatably provided to selectively open and close the air ports 31–33, respectively. The mode switching doors 34–36 are driven by an actuator such as a servomotor through a link mechanism (not shown). An air-conditioning control unit (ECU) 26 is constructed by a microcomputer and its peripheral circuit. The ECU 26 performs predetermined processing in accordance with a beforehand set program, and controls operation states of the solenoid valves 13, 21 and operation states of other electric apparatuses 11, 14a, 23, 25 and the likes.

Figure 2:
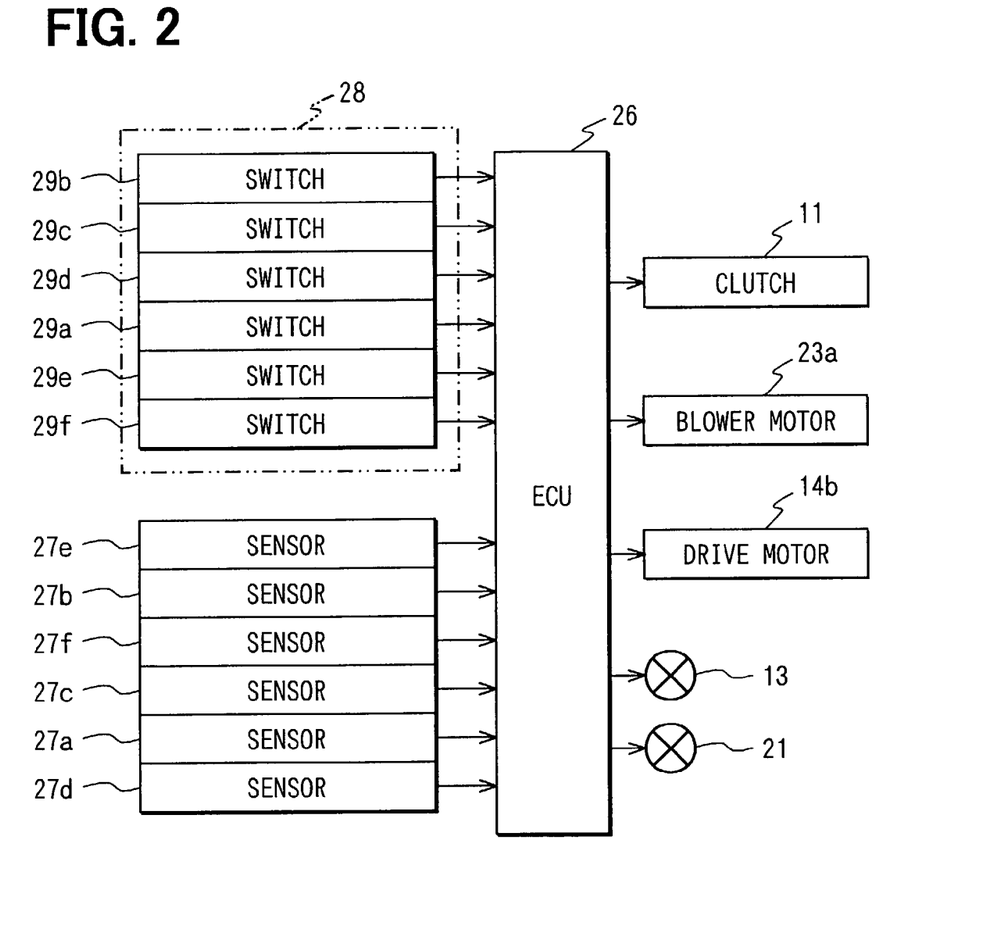
FIG. 2 is a block diagram showing electronic control in the vehicle air conditioner according to the first embodiment.

As shown in FIG. 2, detection signals are input to the ECU 26 from a sensor group including a water temperature sensor 27a of the vehicle engine 12, an outside air temperature sensor 27b, an evaporator temperature sensor 27c, a pressure sensor 27d, an inside air temperature sensor 27e and a sunlight sensor 27f. The pressure sensor 27d is for detecting the pressure of refrigerant discharged from the compressor 10, and the sunlight sensor 27f is for detecting an amount of sunlight radiated into the passenger compartment, and the evaporator temperature sensor 27c is for detecting an air temperature immediately blown from the evaporator 18.

Operation signals are input to the ECU 26 from an operational switch group provided on an air-conditioning operation panel 28 disposed around a dashboard in the passenger compartment. The operational switch group includes an air-conditioning switch 29a, a hot gas switch 29b, an air outlet mode switch 29c, a temperature setting switch 29d, a blower switch 29e, an inside-outside air switch 29f and the like. The air-conditioning switch 29a is for commanding to start and stop the operation of the compressor 10, and is also a cooling switch for setting the cooling mode. The hot gas switch 29b is for setting the heating mode using the hot-gas heater cycle H, and is also used as a heating switch. The air outlet mode switch 29c is for switching an air outlet mode, and the temperature setting switch 29d is for setting an air temperature in the passenger compartment. The blower switch 29e is for commanding to turn on and turn off the blower 23 and to set the air blowing amount of the blower 23. The inside-outside air switch 29f is for commanding to switch one of the outside air inlet mode and the inside air inlet mode, for example.

Figure 3:
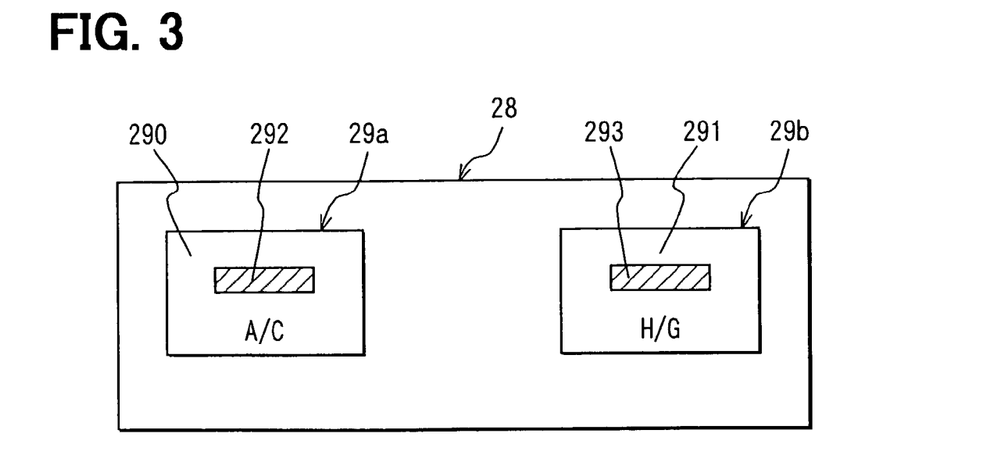
FIG. 3 is a schematic diagram showing an air conditioning switch (A/C) and a hot gas switch (H/G) used in the vehicle air conditioner according to the first embodiment.

The air conditioning switch 29a and the hot gas switch 29b are disposed on the air-conditioning operation panel 28 as shown in FIG. 3, and are operated in independent from each other. Both the switches 29a, 29b includes push-button operational knobs 290, 291 each having a rectangular shape, respectively. The operational knobs 290, 291 are pushed and operated by a passenger. The operational knob 290 includes a cooling indicator 292 constructed by a light emitting diode (LED), and the operational knob 291 includes a heating indicator 293 constructed by the LED. Each of the switches 29a, 29b is a momentary switch. A command state is switched between a set command state of the cooling mode and a release command state thereof every pushing of the operational knob 290 of the air conditioning switch 29a. This command state of the air conditioning switch 29a, for setting the cooling mode or for stopping the cooling mode, is stored in a memory device of the ECU 26. Similarly, a command state is switched between a set command state of the hot-gas heating mode and a release command state thereof every pushing of the operational knob 291 of the hot gas switch 29b. This command state of the hot gas switch 29b, for setting the hot-gas heating mode or for stopping the hot-gas heating mode, is also stored in the memory device of the ECU 26.

Specifically, when the cooling mode is commanded by once pushing of the operational knob 290 of the air conditioning switch 29a, this command state is stored in the memory device of the ECU 26 until the operational knob 290 is next pushed. Similarly, when the hot-gas heating mode is commanded by once pushing of the operational knob 291 of the hot gas switch 29b, this command state is also stored in the memory device of the ECU 26 until the operational knob 291 is next pushed. Even when the vehicle engine 12 is stopped, that is, even when an ignition switch is turned off, the command state is stored in the memory. The command state for commanding the cooling mode is informed by lighting of the cooling indicator 292, and the command state for commanding the hot-gas heating mode is informed by lighting of the heating indicator 293.

Next, operation of the vehicle air conditioner according to the first embodiment will be described. At first, operation of the refrigerant cycle will be described. When the cooling mode is set by turning on the air conditioning switch 29a, the cooling solenoid valve 13 is opened and the heating solenoid valve 21 is closed by the ECU 26. Further, the solenoid clutch 11 is turned on. Then, the compressor 10 is driven by the vehicle engine 12 through the solenoid clutch 11 to compress refrigerant, and gas refrigerant discharged from the compressor 10 flows into the condenser 14 through the opened cooling solenoid valve 13. In the condenser 14, the gas refrigerant from the compressor 10 is cooled by outside air blown by the cooling fan 14a, and is liquefied (condensed). The condensed refrigerant is separated into gas refrigerant and liquid refrigerant in the receiver 15, and only the separated liquid refrigerant is decompressed by the thermal expansion valve 16 to be a gas-liquid two-phase refrigerant having a low temperature and low pressure. The low-pressure refrigerant passes through the check valve 17, and flows into the evaporator 18. In the evaporator 18, the low-pressure refrigerant absorbs heat from air blown by the blower 23, and is evaporated. The cooled air from the evaporator 18 flows into the passenger compartment from the face air port 32 and the like, and the passenger compartment is cooled. The refrigerant evaporated in the evaporator 18 is sucked into the compressor 10 through the accumulator 19, and is compressed again in the compressor 10.

In winter, when the heating mode using the hot-gas heater cycle H is set by turning on the hot gas switch 29b, the cooling solenoid valve 13 is closed and the heating solenoid valve 21 is opened by the ECU 26. Therefore, high-temperature gas refrigerant (super-heated gas refrigerant), discharged from the compressor 10, flows through the opened heating solenoid valve 21, and is decompressed in the throttle 21a. Thereafter, the decompressed refrigerant from the throttle 21a flows into the evaporator 18. That is, the supper-heated gas refrigerant (hot gas) discharged from the compressor 10 bypasses the condenser 14 and the like, and is introduced directly into the evaporator 18. At this time, the check valve 17 prevents the gas refrigerant from flowing into the thermal expansion valve 16 from the hot-gas bypass passage 20. Accordingly, the refrigerant cycle is operated in the closed circuit (hot-gas heater cycle H) from the discharge port of the compressor 10 to the suction port of the compressor 10 through the heating solenoid valve 21, the throttle 21a, the evaporator 18 and the accumulator 19.

Then, the super-heated gas refrigerant, decompressed in the throttle 21a, radiates heat in the evaporator 18, so that air passing through the evaporator 18 is heated. An amount of heat, radiated from the gas refrigerant in the evaporator 18, corresponds to a compression work amount of the compressor 10. The gas refrigerant, having been radiated in the evaporator 18, is sucked into the compressor 10 through the accumulator 19, and is compressed again in the compressor 10. When a water temperature in the hot water cycle is low, for example, at a time directly after the start of the vehicle engine 12, warming-up control is performed so that the blower 23 is operated at a low blowing amount. Hot water from the vehicle engine 12 is circulated into the heating heat exchanger 24 through the hot water valve 25, so that air heated by the evaporator 18 is further heated by the heating heat exchanger 24 in the air conditioning case 22. Accordingly, in the winter, higher-temperature warm air, heated by both of the evaporator 18 and the heating heat exchanger 24, can be blown into the passenger compartment, and heating capacity for heating the passenger compartment can be increased.

Figure 4:
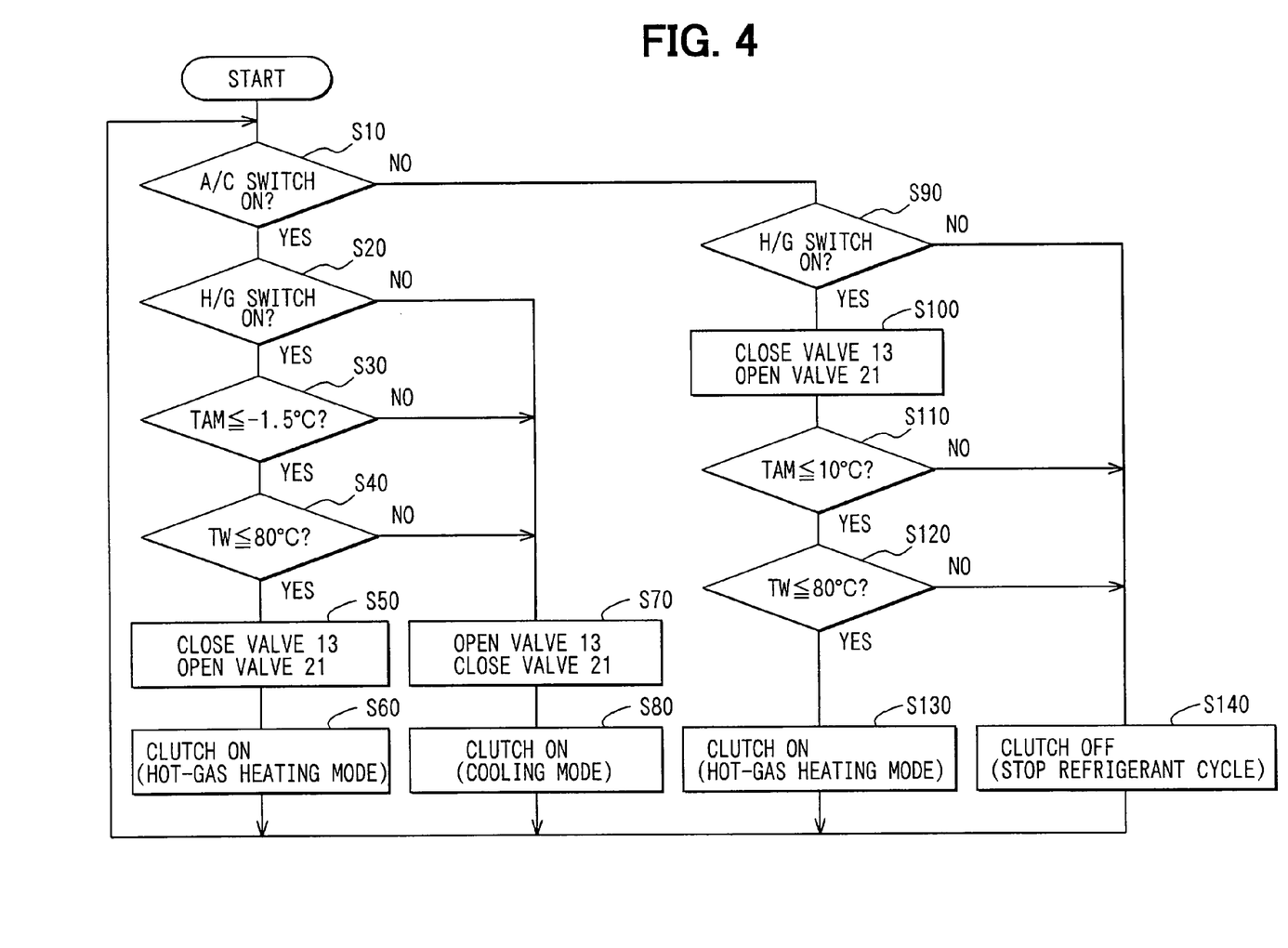
FIG. 4 is a flow diagram showing control process in the vehicle air conditioner according to the first embodiment.

Next, the switching control between the cooling mode and the hot-gas heating mode, using the air conditioning switch 29a and the hot gas switch 29b on the air-conditioning operation panel 28, will be described specifically with reference to FIG. 4. A control routine of FIG. 4 is started when operation of the vehicle engine 12 is started, that is, when the ignition switch is turned on. At step S10, it is determined whether or not the air conditioning switch 29a on the air-conditioning operation panel 28 is turned on. When the air conditioning switch 29a is turned on, it is determined at step S20 whether or not the hot gas switch 29b is turned on. When the hot gas switch 29b is turned on, it is determined at step S30 whether or not an outside air temperature TAM is equal to or lower than a first predetermined air temperature (e.g., −1.5° C.). The determination at step S30 is performed to determine any one of the cooling mode and the hot-gas heating mode when both switches 29a, 29b are turned on at the same time. In the present example, when the outside air temperature TAM is equal to or lower than the first predetermined temperature (e.g., −1.5° C.), that is, when the outside air temperature TAM is in the very low outside-temperature area, the hot-gas heating mode is selected to improve the heating capacity of the passenger compartment. In the first embodiment, when both the switches 29a, 29b are turned on at step S10 and step S20, when the outside air temperature TAM is equal to or lower than the first predetermined temperature (e.g., −1.5° C.), the hot-gas heating mode is selected as a priority mode having a high necessary.

Then, it is determined at step S40 whether or not an engine water temperature (TW) is equal to or lower than a predetermined water temperature (e.g., 80° C.). The determination at step S40 is performed to determine whether or not the engine water temperature is in a low temperature area where the hot-gas heating mode is required. When the engine water temperature is equal to or lower than the predetermined water temperature, the hot-gas heating mode is set at step S50. In the hot-gas heating mode, the cooling solenoid valve 13 is closed, and the heating solenoid valve 21 is opened. Then, the compressor 10 is driven by energizing the solenoid clutch 11 at step S60, so that refrigerant discharged from the compressor 10 is circulated in the hot-gas heater cycle H, and the hot-gas heating mode is performed.

At step S30, when the determination is NO, that is, when the outside air temperature TAM is higher than the first predetermined air temperature, the cooling mode can be determined to be more required than the hot-gas heating mode. At step S70, the cooling solenoid valve 13 is opened, and the heating solenoid valve 21 is closed, so that the cooling operation is performed in the refrigerant cycle. Then, at step S80, the compressor 10 is driven by energizing the solenoid clutch 11. Thus, refrigerant discharged from the compressor 10 is circulated in the cooling refrigerant cycle C, and the cooling mode is performed in the refrigerant cycle. In the first embodiment, when both the switches 29a, 29b are turned on at step S10 and step S20, when the outside air temperature TAM is higher than the first predetermined temperature (e.g., −1.5° C.), the cooling mode is selected as the priority mode having the high necessary.

When the determination is NO at steps S20, S40, the hot-gas heating mode can be determined to be not required. In this case, at steps S70, S80, the cooling mode is performed in the refrigerant cycle. When the determination at step S10 is NO, that is, when the air conditioning switch 29a is not turned on, it is determined at step S90 whether or not the hot gas switch 29b is turned on. When the hot gas switch 29b is turned on, the hot-gas heating mode is set at step S100. In the hot-gas heating mode, the cooling solenoid valve 13 is closed, and the heating solenoid valve 21 is opened.

Next, at step S110, it is determined whether or not the outside air temperature TAM is equal to or lower than a second predetermined air temperature (e.g., 10° C.). The second predetermined air temperature is much higher than the first predetermined air temperature, for example, 10° C. When the outside air temperature TAM is equal to or lower than the second predetermined air temperature, the hot-gas heating mode is determined to be required. When the outside air temperature TAM is higher than the second predetermined air temperature, the hot-gas heating operation is determined to be not required due to the reduction of a heating load. When the determination at step S110 is YES, it is determined at step S120 whether or not the engine water temperature TW is equal to or lower than the predetermined water temperature (e.g., 80 degrees centigrade). When the engine water temperature TW is equal to or lower than the predetermined water temperature, the hot-gas heating mode is set at step S130. In the hot-gas heating mode, the compressor 10 is driven by energizing the solenoid clutch 11. Thus, refrigerant discharged from the compressor 10 is circulated in the hot-gas heater cycle H, and the hot-gas heating mode is performed in the refrigerant cycle.

When the determination is NO at steps S90, S120, the hot-gas heating mode is not required. At step S140, the operation of the compressor 10 is stopped by turning off the solenoid clutch 11, and the operation of the refrigerant cycle is stopped.

As described above, according to the control process shown in FIG. 4, when both switches 29a, 29b are turned on at the same time, it is determined at step S30 whether the outside air temperature TAM is high or low. When the outside air temperature TAM is in the very low outside-temperature area, that is, when the outside air temperature TAM is equal to or lower than the first predetermined air temperature, the hot-gas heating mode is automatically selected as the priority mode having the higher necessary, and the hot-gas heating mode is performed in the refrigerant cycle. Accordingly, even when the turned-on state of the air conditioning switch 29a is maintained in the very low outside-temperature area, the hot-gas heating mode is automatically selected, thereby rapidly starting a heating operation for heating the passenger compartment. In this case, the heating operation of the passenger compartment can be performed using the heater core 24 and the evaporator 8.

(Second Embodiment)

Figure 5:
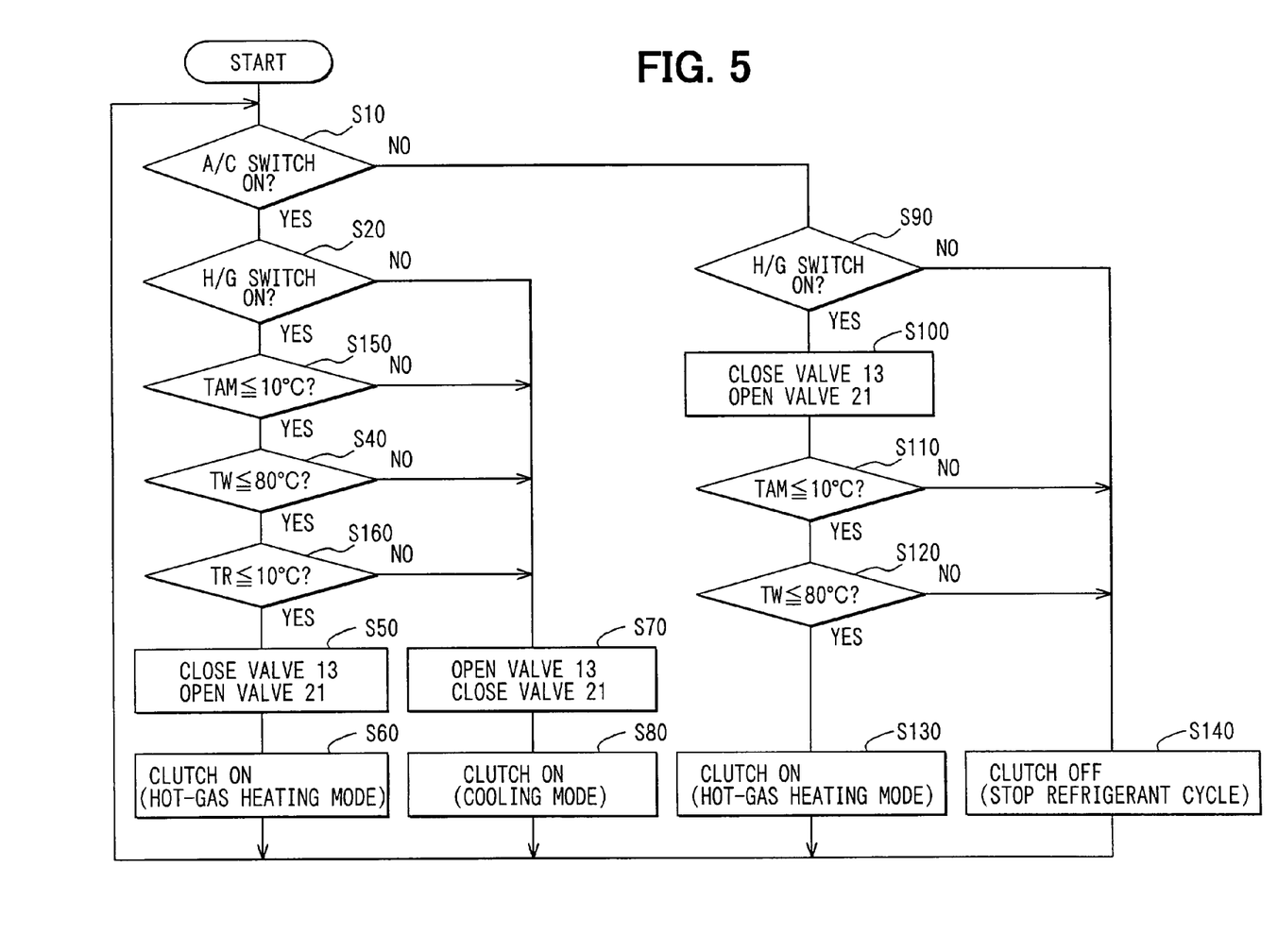
FIG. 5 is a flow diagram showing control process in a vehicle air conditioner according to a second embodiment of the present invention.

In the first embodiment, when both switches 29a, 29b are turned on at the same time, any one of the cooling mode and the hot-gas heating mode is selected in the refrigerant cycle based on the outside air temperature TAM. However, in the second embodiment, this selection is performed based on an inside air temperature TR in place of the outside air temperature. As shown in FIG. 5, in the second embodiment, steps S150, S160 are different from the first embodiment shown in FIG. 4. At step S150, it is determined whether or not the outside air temperature TAM is in the low outside-temperature area where the hot-gas heating mode is required, in the same manner at step S110. Then, at step S160, it is determined whether or not the inside air temperature TR in the passenger compartment is equal to or lower than a predetermined air temperature (e.g., 10° C.). When the inside air temperature TR is equal to or lower than the predetermined air temperature, the hot-gas heating mode is automatically set in the refrigerant cycle, so that the heating operation in the passenger compartment is rapidly started. When the inside air temperature TR is higher than the predetermined air temperature, the cooling mode is automatically selected in the refrigerant cycle.

According to the second embodiment, when both the switches 29a, 29b are turned on at step S10 and step S20, when the inside air temperature TR is lower than the predetermined air temperature (e.g., 10° C.), the hot-gas heating mode is automatically selected as the priority mode having the high necessary. On the other hand, when both the switches 29a, 29b are turned on at step S10 and step S20, when the inside air temperature TR is higher than the predetermined air temperature (e.g., 10° C.), the cooling mode is automatically selected as the priority mode having the high necessary.

In the second embodiment, the other parts are similar to those of the above-described first embodiment.

(Third Embodiment)

Figure 6:
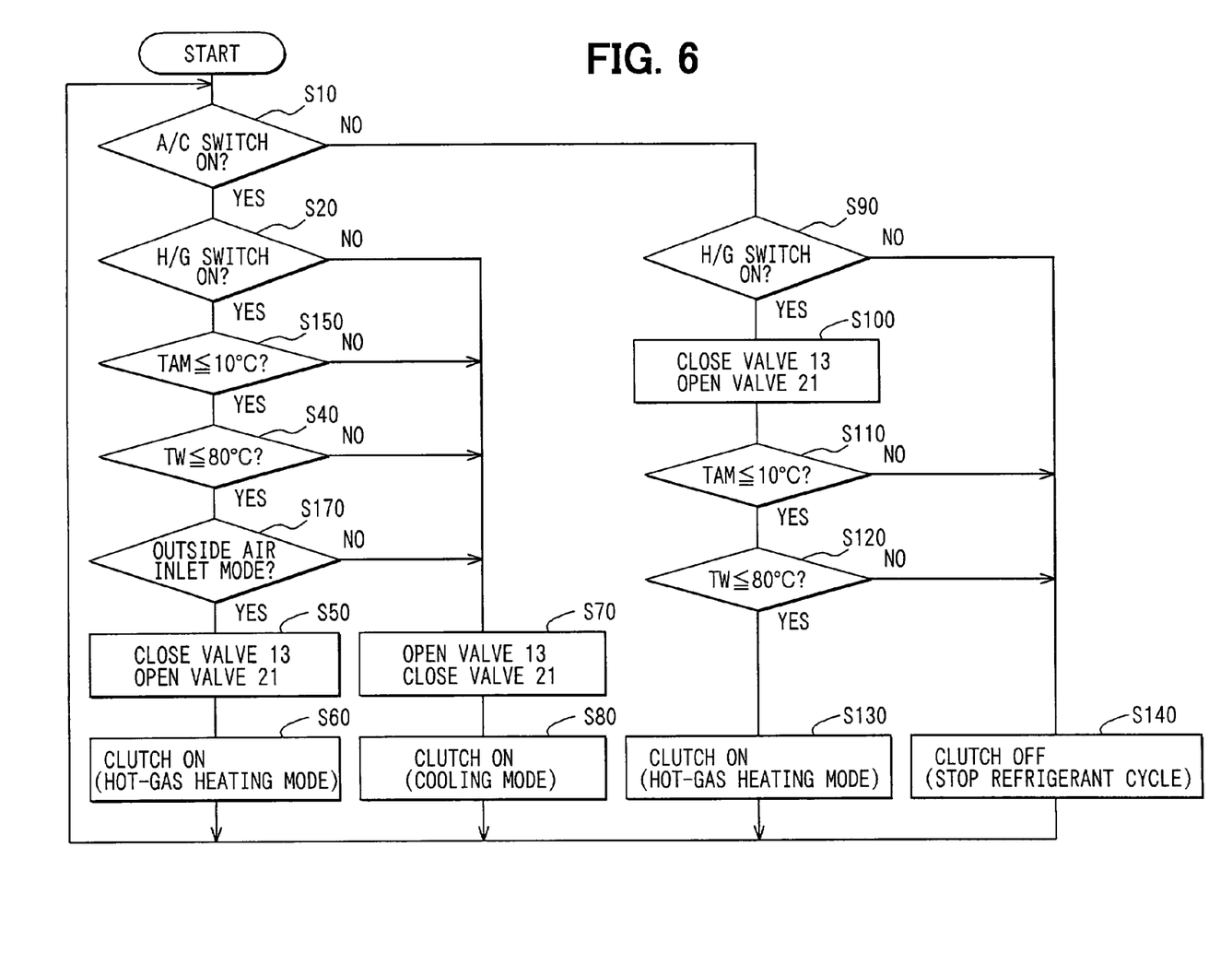
FIG. 6 is a flow diagram showing control process in a vehicle air conditioner according to a third embodiment of the present invention.

As shown in FIG. 6, in the third embodiment, step S170 is provided in place of step S160 in the second embodiment. At step S170, it is determined whether or not an outside-air inlet mode is selected in the air-conditioning operation. When the outside-air inlet mode is selected, the hot-gas heating mode is automatically selected, and the heating operation in the passenger compartment is rapidly started. When an inside-air inlet mode is selected, the cooling mode is automatically selected.

When the outside-air inlet mode is selected in the winter, the heat load is increased due to the suction of low-temperature outside air, thereby increasing the necessity for the hot-gas heating mode. When the inside-air inlet mode is selected in the winter, the heat load is reduced due to the suction of inside air having a higher temperature than outside air, and a windshield is readily clouded due to the suction of inside air having higher absolute humidity than outside air. Accordingly, when both the switches 29a, 29b are turned on, the hot-gas heating mode is automatically selected in the refrigerant cycle when the outside-air inlet mode is selected, and the cooling mode is automatically selected in the refrigerant cycle when the inside-air inlet mode is selected. That is, when both the switches 29a, 29b are turned on, the hot-gas heating mode is performed in the refrigerant cycle as the priority mode having the higher necessity in the outside-air inlet mode, and the cooling mode is performed in the refrigerant cycle as the priority mode having the higher necessity in the inside-air inlet mode.

(Fourth Embodiment)

Figure 7:
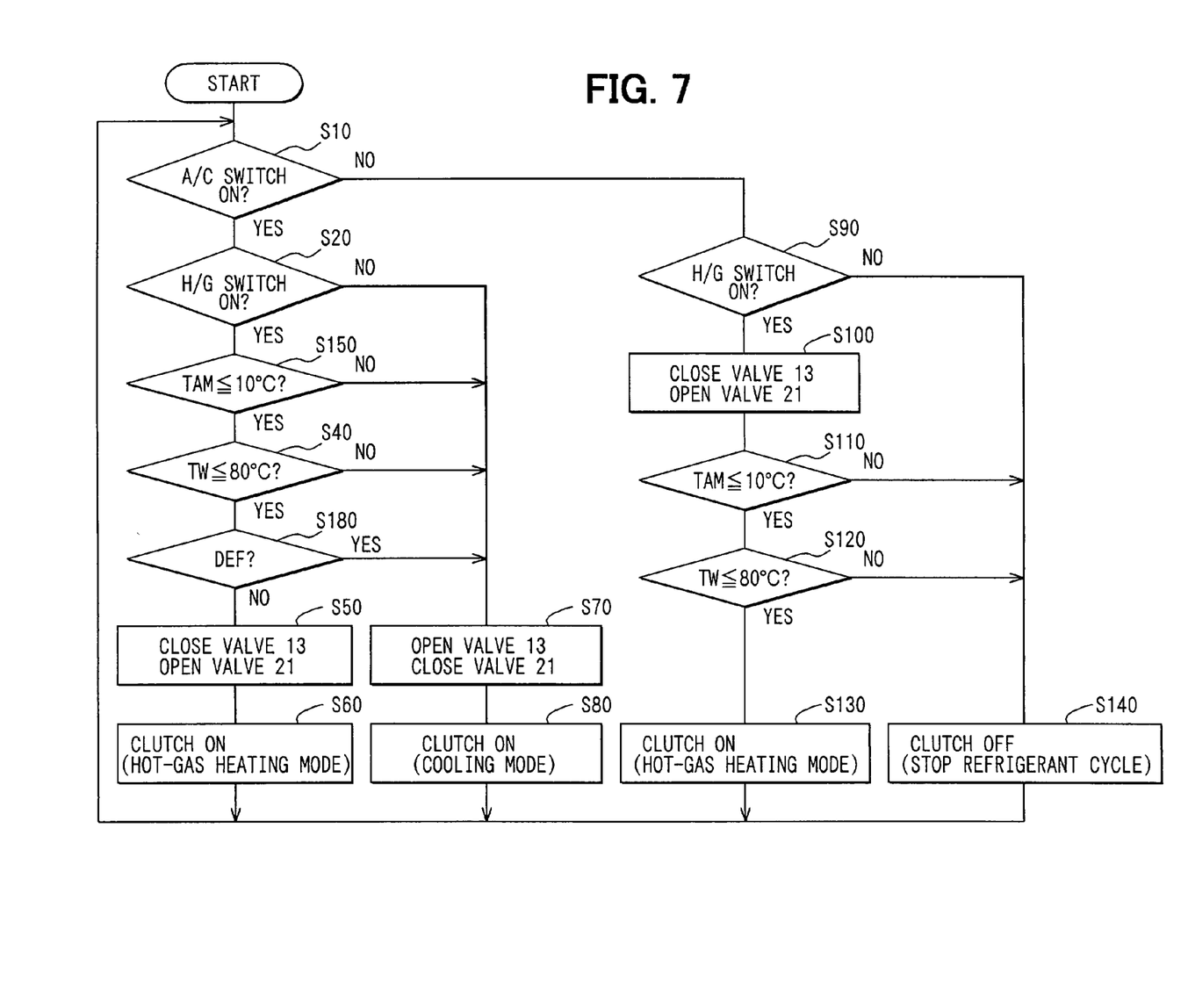
FIG. 7 is a flow diagram showing control process in a vehicle air conditioner according to a fourth embodiment of the present invention.

As shown in FIG. 7, in the fourth embodiment, steps S180 is provided in place of step S160 in the second embodiment or step S170 in the third embodiment. At step S180, it is determined whether or not a defroster mode (DEF) is selected as an air outlet mode of the air conditioning operation. When the defroster mode is selected, the cooling mode is selected in preference in the refrigerant cycle, for defrosting performance of the windshield. When the air outlet mode is not the defroster mode, since the defrosting performance is unnecessary to be improved, the hot-gas heating mode is selected in the refrigerant cycle, so that the heating operation in the passenger compartment is rapidly started.

For example, except for the defroster mode, one of a face mode, a bi-level mode, a foot mode and a foot-defroster mode can be set as an air outlet mode. In FIG. 1, conditioned air is blown from the face air port 32 toward the upper area of a passenger in the face mode. In the bi-level mode, the conditioned air is blown from the face air port 32 and the foot air port 33 toward the upper area of the passenger and a foot portion of the passenger at the same time. In the foot mode, the conditioned air is mainly blown from the foot air port 33 toward the foot area of the passenger while a small amount of the conditioned air is blown from the DEF air port 31 toward an inner surface of the windshield. In the foot-defroster mode, an approximately same amount of conditioned air is blown from the DEF air port 31 and the foot air port 33 toward the inner surface of the windshield and the foot portion of the passenger. In both of the foot-defroster mode and the defroster mode, it is necessary to improve the defrosting performance for defrosting the windshield. Therefore, the cooling mode of the refrigerant cycle can be selected in both of the foot-defroster mode and the defroster mode, and the hot-gas heating mode can be selected in an air outlet mode except for the foot-defroster mode and the defroster mode.

According to the fourth embodiment, when both the switches 29a, 29b are turned on, the cooling mode is selected as the priority mode to be performed in the refrigerant cycle in a defrosting-performance enhancing mode in which the defrosting performance of the windshield is enhanced, such as the defroster mode and the foot-defroster mode. On the other hand, the hot-gas heating mode is selected as the priority mode to be performed in the refrigerant cycle in an air outlet except for the defrosting-performance enhancing mode, such as the face mode and the foot mode.

Although the present invention has been fully described in connection with the preferred embodiments thereof with reference to the accompanying drawings, it is to be noted that various changes and modifications will become apparent to those skilled in the art.

For example, in the above-described first embodiment, when each of the operational knobs 290, 291 of the switches 29a, 29b shown in FIG. 3 is pushed, the command state is stored in the memory device of the ECU 26 until the next push operation. However, each of the switches 29a, 29b may be a push button switch having a mechanical lock mechanism. In this case, when each of the switches 29a, 29b is pushed, the pushed operational state is maintained by the mechanical lock mechanism. Then, when the switch is again pushed, the pushed operational state is released. Therefore, the command state is not required to be stored in the memory device.

Such changes and modifications are to be understood as being within the scope of the present invention as defined by the appended claims.

What is claimed is:

1. An air conditioner for a vehicle, comprising:
   an air conditioning case in which air flows toward a passenger compartment of the vehicle;
   a refrigerant cycle including a compressor for compressing and discharging refrigerant, and an interior heat exchanger for cooling air by absorbing heat from air in a cooling mode, the interior heat exchanger being disposed in the air conditioning case to heat air in a heating mode where the refrigerant discharged from the compressor is introduced directly into the interior heat exchanger, the refrigerant cycle being provided to switch one of the cooling mode and the heating mode;
   a control unit for controlling operation of the refrigerant cycle;
   a cooling mode switch for outputting an operational command of the cooling mode to the control unit, and
   a heating mode switch for outputting an operational command of the heating mode to the control unit, the heating mode switch being operated independent from the cooling mode switch, wherein:
   the control unit selects the cooling mode when the operational command from the cooling mode switch is input to the control unit, and selects the heating mode when the operational command from the heating mode switch is input to the control unit;
   when the operational commands from both of the cooling mode switch and the heating mode switch are input to the control unit at the same time, the control unit always selects one of the cooling mode and the heating mode and no other mode as a priority mode for.

2. The air conditioner according to claim 1, wherein:
   the control unit determines the priority mode based on an air temperature outside the passenger compartment;
   the control unit selects the cooling mode when the air temperature outside the passenger compartment is higher than a predetermined air temperature; and
   the control unit determines the heating mode when the air temperature outside the passenger compartment is equal to or lower than the predetermined air temperature.

3. The air conditioner according to claim 1, wherein:
   the control unit determines the priority mode based on an air temperature inside the passenger compartment;
   the control unit selects the cooling mode when the air temperature inside the passenger compartment is higher than a predetermined air temperature; and
   the control unit selects the heating mode when the air temperature inside the passenger compartment is equal to or lower than the predetermined air temperature.

4. The air conditioner according to claim 1, wherein:
   the control unit determines the priority mode based on an air inlet mode for introducing air to be blown toward the interior heat exchanger in the air conditioning case;
   the control unit selects the cooling mode when the air inlet mode is an inside-air inlet mode in which air inside the passenger compartment is introduced in the air conditioning case to be blown toward the interior heat exchanger; and
   the control unit selects the heating mode when the air inlet mode is an outside-air inlet mode in which air outside the passenger compartment is introduced in the air conditioning case to be blown toward the interior heat exchanger.

5. The air conditioner according to claim 1, wherein:
   the control unit determines the priority mode based on an air outlet mode for blowing air after passing through the interior heat exchanger into the passenger compartment;
   the control unit selects the cooling mode when the air outlet mode is a defrosting-performance enhancing mode in which defrosting performance for defrosting a windshield is enhanced; and
   the control unit selects the heating mode in an air outlet mode except for the defrosting-performance enhancing mode.

6. The air conditioner according to claim 1, further comprising
   a heating heat exchanger disposed in the air conditioning case at a downstream air side of the interior heat exchanger, for heating air using water from a vehicle engine as a heat source, wherein the compressor is driven by the vehicle engine.

7. The air conditioner according to claim 1, further comprising
   a heating heat exchanger disposed in the air conditioning case at a downstream air side of the interior heat exchanger, for heating air using water from a vehicle engine as a heat source, wherein:
   the control unit determines the priority mode among the cooling mode and the heating mode, based on temperature of water supplied to the heating heat exchanger from the vehicle engine;
   when the temperature of water supplied to the heating heat exchanger is lower than a predetermined water temperature, the control unit selects the heating mode; and
   when the temperature of water supplied to the heating heat exchanger is equal to or higher than the predetermined water temperature, the control unit selects the cooling mode.

8. The air conditioner according to claim 2, further comprising
   a heating heat exchanger disposed in the air conditioning case at a downstream air side of the interior heat exchanger, for heating air using water from a vehicle engine as a heat source, wherein:
   the control unit determines the priority mode among the cooling mode and the heating mode, based on the air temperature outside the passenger compartment and temperature of water supplied to the heating heat exchanger from the vehicle engine;

the control unit selects the heating mode, when the air temperature outside the passenger compartment is equal to or lower than the predetermined air temperature, and when the temperature of water supplied to the heating heat exchanger is lower than a predetermined water temperature.

9. The air conditioner according to claim 1, wherein:

the refrigerant cycle includes an exterior heat exchanger in which refrigerant discharged from the compressor is radiated in the cooling mode, and a cooling decompression unit for decompressing the refrigerant from the exterior heat exchanger in the cooling mode;

the exterior heat exchanger is disposed outside the air conditioning case; and when the cooling mode is selected as the priority mode, only the cooling mode is performed, and refrigerant decompressed in the cooling decompression unit is evaporated by absorbing heat from air within the air conditioning case during the cooling mode.

* * * * *